United States Patent
Childers

(10) Patent No.: US 7,092,137 B2
(45) Date of Patent: *Aug. 15, 2006

(54) METHOD AND SYSTEM FOR GENERATING COLOR USING A LOW-RESOLUTION SPATIAL COLOR MODULATOR AND A HIGH-RESOLUTION MODULATOR

(75) Inventor: Winthrop D. Childers, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/962,277

(22) Filed: Oct. 7, 2004

(65) Prior Publication Data

US 2005/0162725 A1 Jul. 28, 2005

Related U.S. Application Data

(63) Continuation of application No. 10/754,758, filed on Jan. 8, 2004, now Pat. No. 6,850,352.

(51) Int. Cl.
*G02F 1/00* (2006.01)

(52) U.S. Cl. .................................. 359/237

(58) Field of Classification Search ............ 359/245, 359/237, 242, 443, 453, 456, 460; 382/162; 353/31; 345/32, 38; 348/744

See application file for complete search history.

(56) References Cited

U.S. PATENT DOCUMENTS

| | | | |
|---|---|---|---|
| 4,956,704 A * | 9/1990 | Yamada | 358/538 |
| 5,815,221 A | 9/1998 | Kojima et al. | |
| 5,986,796 A | 11/1999 | Miles | |
| 6,657,603 B1 | 12/2003 | Demetrescu et al. | |
| 2002/0030636 A1 | 3/2002 | Richards | |
| 2003/0048393 A1* | 3/2003 | Sayag | 349/5 |

FOREIGN PATENT DOCUMENTS

JP 2002-091385 3/2002

* cited by examiner

*Primary Examiner*—Hung Xuan Dang
*Assistant Examiner*—Tuyen Tra

(57) ABSTRACT

A method and system for generating an image. The image includes an array of low-resolution pixels each including a plurality of high-resolution pixels. The display system includes a first light modulator having an array of color pixel elements wherein each of the color pixel elements is configured to independently modulate a spectral distribution of one of the low-resolution pixels and a second light modulator having an array of gray scale pixel elements each configured to independently modulate a gray scale of the high-resolution pixels. The first and second light modulators are configured to cooperatively operate such that each of the low-resolution pixels includes a number of groups of high-resolution pixels each having a different hue.

21 Claims, 14 Drawing Sheets

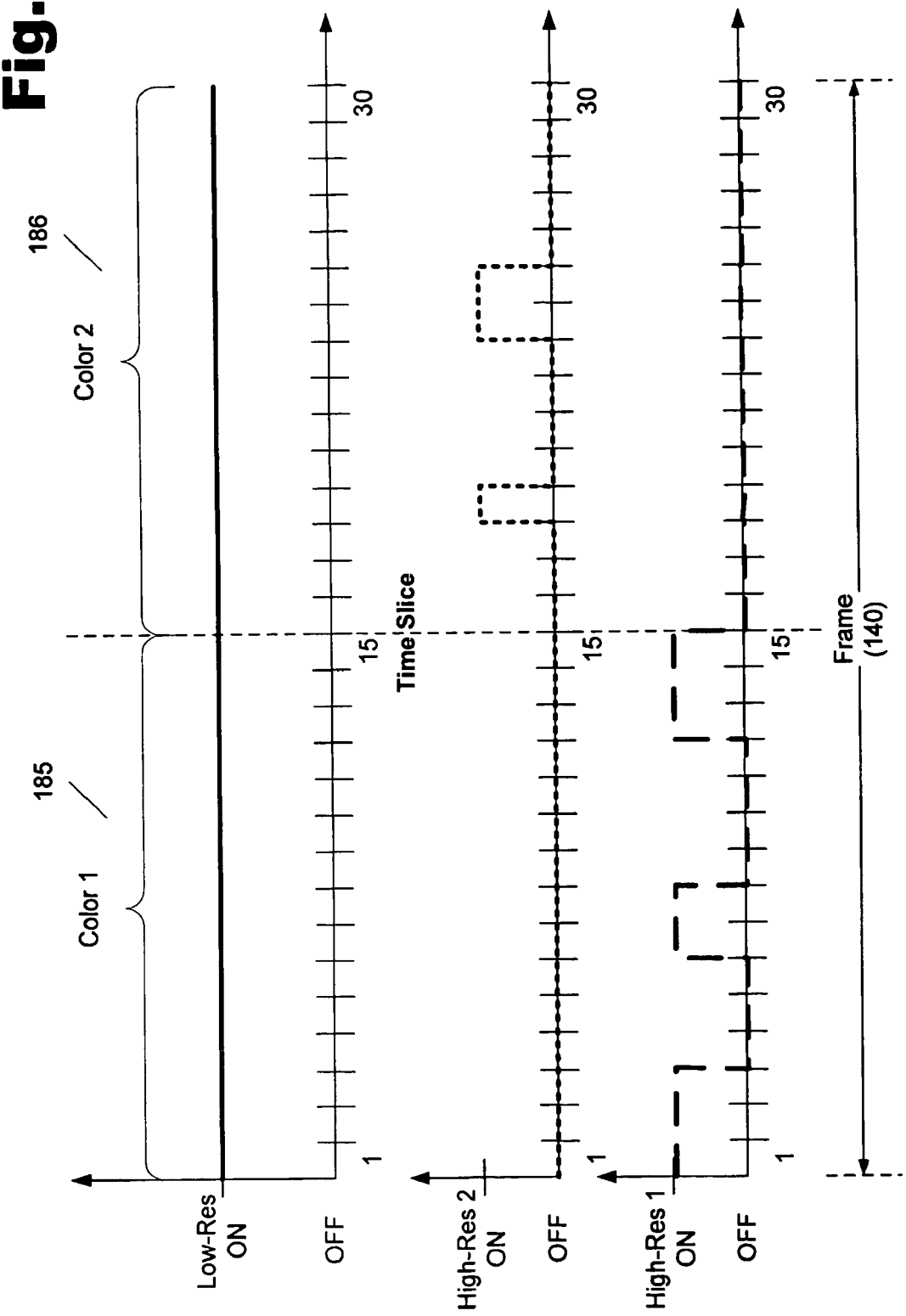

ments of the present invention and are a part of the specification. The illustrated embodiments are merely examples of the present invention and do not limit the scope of the invention.

METHOD AND SYSTEM FOR GENERATING COLOR USING A LOW-RESOLUTION SPATIAL COLOR MODULATOR AND A HIGH-RESOLUTION MODULATOR

This application is a continuation of Ser. No. 10/754,758, now U.S. Pat. No. 6,850,352, filed Jan. 8, 2004, which is hereby incorporated by reference.

BACKGROUND

A conventional system or device for displaying an image, such as a display, projector, or other imaging system, is frequently used to display a still or video image. Viewers evaluate display systems based on many criteria such as image size, contrast ratio, color purity, brightness, pixel color accuracy, and resolution. Brightness and resolution are particularly important metrics in many display markets.

One typical display system includes a light source, a color wheel, and a spatial light modulator. Light generated from the light source is directed onto the color wheel, which sequentially filters light from the light source. The color wheel typically generates red light, green light, and blue light. The red, green, and blue light are sequentially sent to the spatial light modulator, which modulates the colored light depending on the desired image.

However, the use of a color wheel and a spatial light modulator may affect the brightness and resolution of the displayed image. For example, the use of a color wheel in combination with a spatial light modulator may result in flickering and/or other undesirable visual artifacts. Moreover, because a color wheel only provides only one color at a time to a spatial light modulator, the brightness of the displayed image may be negatively affected.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

FIG. 14 is a timing diagram showing the on/off state during each time slice of a frame of a low-resolution pixel, a high-resolution pixel of the first color, and a high-resolution pixel of the second color wherein the states of the high-resolution pixels are varied to achieve their respective desired color intensities.

Throughout the drawings, identical reference numbers designate similar, but not necessarily identical, elements.

DETAILED DESCRIPTION

Figure 1:
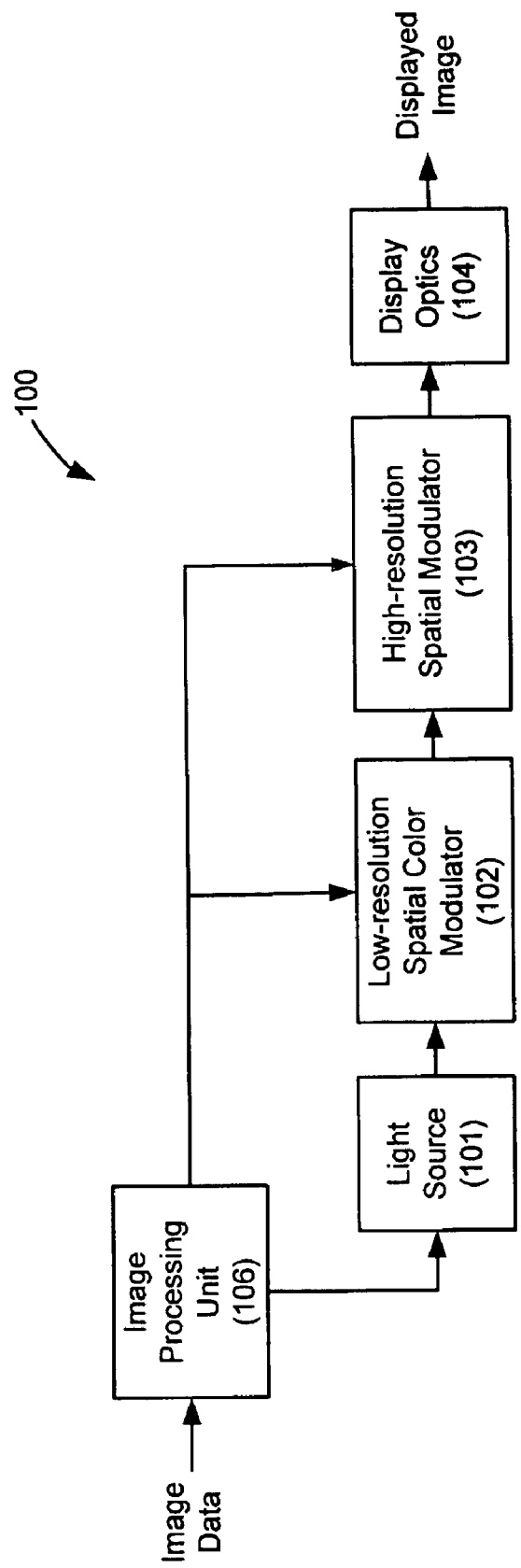
FIG. 1 illustrates an exemplary display system according to one exemplary embodiment.

The present specification describes a method and system for generating a color image using a first light modulator that is in series or optically coupled to a second light modulator. In this specification we refer to a "frame" period. As used herein and the appended claims, a "frame" or a "frame period" will refer to a time period during which a display system generates a representation of a digital frame onto a viewing surface. A "digital frame" may be defined by a data array representing the image for one frame period. In an exemplary embodiment the frame period may have, but is not limited to, a duration of $1/60^{th}$ of a second.

The first light modulator may include a first array of color pixel elements that each modulate color independently of each other. The term "modulates color" refers to changing the spectral distribution of the incoming light. For example, one pixel element of the first light modulator may receive incoming essentially white light and output a color distribution that has a peak at a particular wavelength such as red, green, blue, yellow, cyan, magenta, orange, or some other color.

In this specification we refer to a "color sub-frame" period for a given pixel element of the first light modulator. A color sub-frame period is a portion or all of the frame period during which the pixel element outputs a certain hue or tone.

In an exemplary embodiment the first light modulator utilizes a technique called "pulse width modulation" to vary both the hue and output energy of light. Pulse width modulation refers to generating a series of "on" and "off" states during a frame period or a "sub-frame" period to alter the perceived output intensity of the modulator. It also refers to combining several different "on" states having varying spectral peaks and time durations to define an average hue for a sub-frame period.

The second light modulator may include a second array of gray scale pixel elements each configured to modulate gray scale levels of light. By modulating gray scale levels, we refer to modulating the energy passed or reflected during a frame period. This gray scale level modulation may be accomplished by pulse width modulation, analog operation, or with dithering or checkerboard patterns. The second light modulator may comprise a micromirror array that uses pulse width modulation, for example. On the other hand, the second light modulator may be a liquid crystal display (LCD) operating in an analog mode wherein gray scale levels may be continuously varied by applying varying voltages to the liquid crystals to affect the percentage of light passed on a pixel by pixel basis. Dithering or checkerboard patterns refer to the area density of pixel elements that are in the "on" state.

In one exemplary embodiment, the first light modulator is a relatively lower resolution color modulator for generating color levels across an image to be displayed. In this embodiment, the second light modulator is a relatively higher resolution gray scale modulator for enhancing image resolution and/or contrast. The light modulators may be configured to work together in a complementary and/or cooperative way to define color transitions that are more abrupt or of shorter dimension than that which can be provided with a just the first light modulator. As used herein and in the appended claims, the term "low-resolution spatial color modulator" or "color modulator" will be used to refer to the first light modulator that has a relatively lower spatial resolution than the second light modulator. Furthermore, as used herein and in the appended claims, the term "high-resolution spatial modulator" or "high-resolution modulator" will be used to refer to the second light modulator that has a relatively higher spatial resolution than does the color modulator.

In one exemplary embodiment, two colors including a first color and a second color may be displayed with the same pixel element of the low-resolution spatial color modulator. If two colors are to be displayed with the same pixel element of the low-resolution spatial color modulator, the frame period is divided into a first color sub-frame period during which the color modulator outputs the first color and a second sub-frame period during which the color modulator outputs the second color.

The order in which light passes through the color modulator and the high-resolution modulator may be varied. For example, the light modulators may be optically coupled in the display system such that light is first passed to the high-resolution modulator and then to the color modulator.

In the following description, for purposes of explanation, numerous specific details are set forth in order to provide a thorough understanding of the present display system. It will be apparent, however, to one skilled in the art that the present display system may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

The term "display system" will be used herein and in the appended claims, unless otherwise specifically denoted, to refer to a projector, projection system, image display system, television system, video monitor, computer monitor system, or any other system configured to display an image. The image may be a still image, a series of images, or motion picture video. The term "image" will be used herein and in the appended claims, unless otherwise specifically denoted, to refer broadly to a still image, series of images, motion picture video, or anything else that is displayed by a display system.

FIG. 1 illustrates an exemplary display system (100) according to an exemplary embodiment. The components of FIG. 1 are exemplary only and may be modified, changed, or added to as best serves a particular application. As shown in FIG. 1, image data is input into an image processing unit (106). The image data defines an image that is to be displayed by the display system (100). While one image is illustrated and described as being processed by the image processing unit (106), it will be understood by one skilled in the art that a plurality or series of images may be processed by the image processing unit (106). The image processing unit (106) performs various functions including controlling the illumination of a light source (101) and controlling a low-resolution spatial color modulator (102) and a high-resolution spatial modulator (103).

As shown in FIG. 1, the light source (101) may be configured to provide a beam of light to a low-resolution spatial color modulator (102). The light source (101) may be, but is not limited to, a high pressure mercury lamp. The low-resolution spatial color modulator (102) is configured to enable the display system (100) to display a color image by modulating light provided by the light source (101) based on input from the image processing unit (106) to form a beam of light bearing a color image. The light may be modulated in its phase, intensity, polarization, direction, wavelength, or any other property inherent to light by the low-resolution spatial color modulator (102). The low-resolution spatial color modulator (102) will be explained in detail below.

Light transmitted by the low-resolution spatial color modulator (102) is focused onto a high-resolution spatial modulator (103) via a polarizer, lens, or via some other device (not shown). The high-resolution spatial modulator (103) is a device that modulates incident light in a spatial pattern corresponding to an electrical or optical input. The incident light may be modulated in its phase, intensity, polarization, direction, wavelength, color, hue, or any other property inherent to light by the high-resolution modulator (103). Thus, the high-resolution modulator (103) of FIG. 1 modulates the light output by the low-resolution spatial color modulator (102) based on input from the image processing unit (106) to form an image bearing beam of light that is eventually displayed or cast by display optics (104) on a viewing surface (not shown). The display optics (104) may comprise any device configured to display or project an image. For example, the display optics (104) may be, but are not limited to, a lens configured to project and focus an image onto a viewing surface. The viewing surface may be, but is not limited to, a screen, television, wall, liquid crystal display (LCD), or computer monitor.

The order in which the low-resolution spatial color modulator (102) and the high-resolution modulator (103) are positioned in the display system (100) may be interchanged according to one exemplary embodiment. For example, the high-resolution modulator (103) may be placed in front of the low-resolution spatial color modulator (102) and modulate light generated by the light source (101). In this case, the low-resolution spatial color modulator (102) may be configured to modulate the light output by the high-resolution modulator (102). However, for explanatory purposes, it will be assumed that the low-resolution modulator (102) comes first in the display system (100) in the examples given herein.

Figure 2:
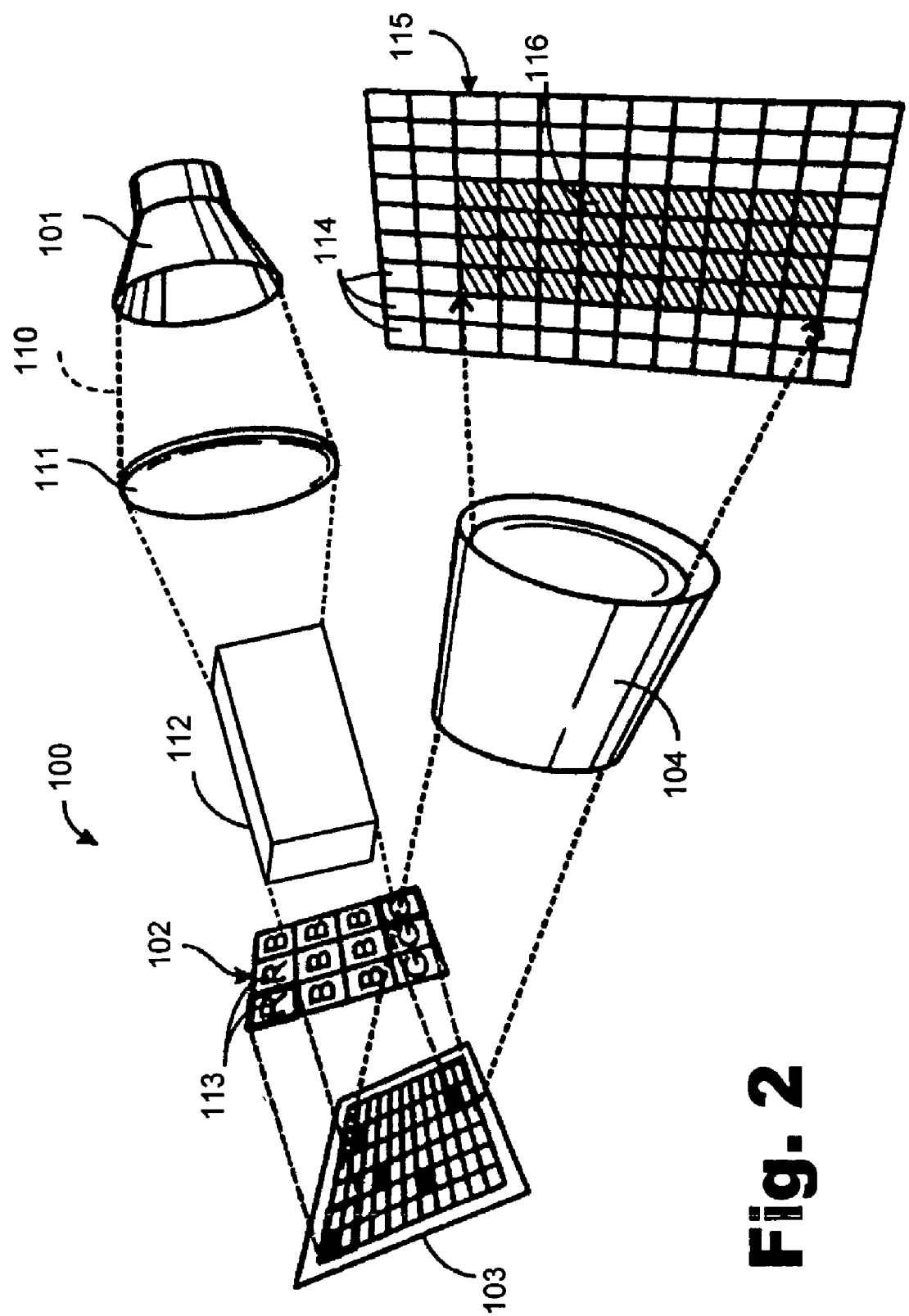
FIG. 2 is a schematic diagram of an exemplary display system incorporating a low-resolution spatial color modulator and a high-resolution modulator according to one exemplary embodiment.

FIG. 2 is a schematic diagram of an exemplary display system (100) incorporating a low-resolution spatial color modulator (102) and a high-resolution modulator (103) according to one exemplary embodiment. As indicated, the display system (100) may be configured to generate an image (116) on a viewing surface (115). In one embodiment, the viewing surface (115) includes a plurality of display pixels (114) which cooperatively interact to form images on the viewing surface (115).

In the depicted display system (100) of FIG. 2, the light source (101) may be, but is not limited to, a high-pressure lamp. The light source (101) may generate light (110) and direct it along an optical path (indicated generally by dashed lines). As indicated, the light (110) may be directed through optics, such as a lens (111) or group of lenses (not shown), an integrator rod (112), and on to a low-resolution spatial color modulator (102).

As shown in FIG. 2, the low-resolution spatial color modulator (102) may be configured to both color separate incident light and spatially separate incident light into a plurality of color light beams. Thus, the low-resolution spatial color modulator (102) may be configured to generate a low-resolution color light array composed of multiple color light beams. For example, the low-resolution spatial color modulator (102) of FIG. 2 is configured to separate the incident light into red (R), blue (B), and green (G) light.

As depicted, the low-resolution spatial color modulator (102) may be any of a number of different modulators configured to spatially separate incident light into a plurality of color light beams. For example, the low-resolution spatial color modulator (102) may be, but is not limited to, a digital light filter or a diffractive light device (DLD). A digital light filter may include a number of individual filter elements (113) configured to selectively pass different color light beams. Each individual filter element (113) may be a suitable color filter that selectively passes some wavelengths (colors) of light and blocks or absorbs other wavelengths (colors) of light. Each filter element (113) may correspond to a different "low-resolution pixel" of the finally displayed image as expressed by a resulting beam of colored light. In one exemplary embodiment, as will be explained below, a low-resolution pixel may comprise a number of display pixels (114).

As mentioned, the low-resolution spatial color modulator (102) may alternatively be an interferometric device, referred to hereafter as a DLD. A DLD has an array of pixel elements or cells that are each independently controllable to receive white light and output light having a spectral distribution that is peaked about a particular wavelength such as red, green, blue, cyan, magenta, yellow, violet, orange, or other colors. When we say that a pixel element outputs a certain color, we mean that it is outputting a spectral distribution that is peaked about that color.

Each cell includes an optical cavity with a dimension normal to the array of cells that is responsive to the application of a voltage across opposing plates that help to define the cavity. The cavity may be defined by controlling voltage across the opposing plates or controlling charge injection to one or both of the opposing plates. The dimension of that optical cavity determines the output spectral peak as discussed above. Further, the cavity has a black state at a certain dimension wherein nearly all of the light is absorbed.

Returning to the exemplary display system (100) of FIG. 2, the resulting beams of colored light (only two of which are shown in FIG. 2 for simplicity) are further directed along the optical path on to a high-resolution modulator (103). As will be explained below, the high-resolution modulator (103) is configured to further refine the low-resolution image generated by the color modulator (102). The resulting high-resolution image (shown again as a single light beam) may be further directed through the display optics (104) and on to the viewing surface (115) to produce the image (116).

The high-resolution modulator (103) may be, but is not limited to, a spatial light modulator (SLM) such as a liquid crystal on silicon (LCOS) array or a micromirror array. LCOS and micromirror arrays are known in the art and will not be explained in detail in the present specification. An exemplary, but not exclusive, LCOS array is the Philips™ LCOS modulator. An exemplary, but not exclusive, micromirror array is the Digital Light Processing (DLP) chip available from Texas Instruments™ Inc. The high-resolution modulator (103) may alternatively be a liquid crystal display (LCD) panel or any other modulator configured capable of high resolution.

The high-resolution modulator (103) shown in FIG. 2 is a reflective modulator for illustrative purposes only. However, the high-resolution modulator (103) may alternatively be a pass-through or transmissive modulator such as an LCD panel. Likewise, the low-resolution spatial color modulator (102) shown in FIG. 2 is a pass-through modulator for illustrative purposes only. However, the low-resolution spatial color modulator (102) may alternatively be a reflective modulator.

Figure 3:
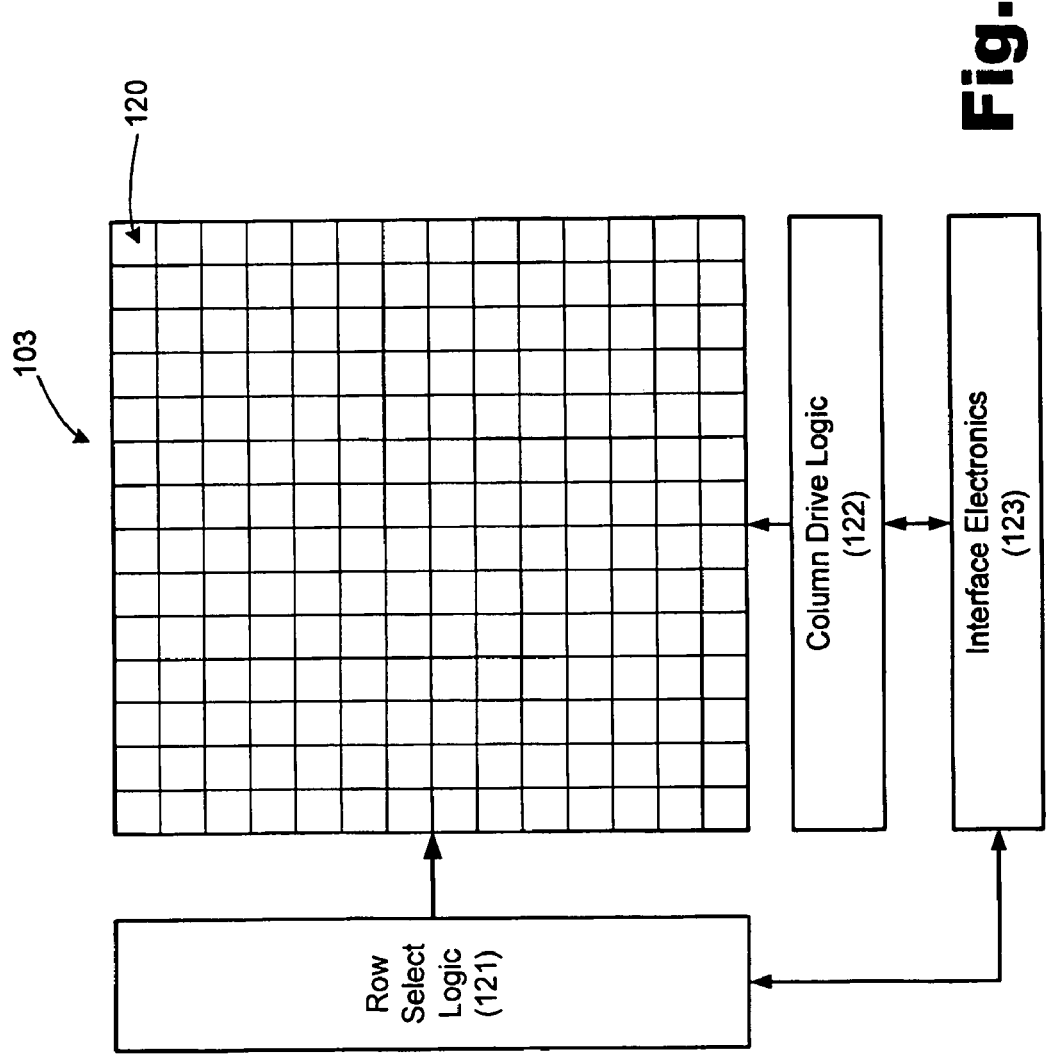
FIG. 3 illustrates an exemplary high-resolution modulator that may be used in the above-described display system according to one exemplary embodiment.

FIG. 3 illustrates an exemplary high-resolution modulator (103) that may be used in the above-described display system (100; FIG. 2) according to one exemplary embodiment. The exemplary high-resolution modulator (103) of FIG. 3 is an SLM comprising an array of micromirrors (120) for illustrative purposes. The array of micromirrors (120) comprises a number of rows of micromirrors (120). Each micromirror (120) corresponds to a display pixel in the high-resolution image that is to be displayed. The micromirrors (120) may be operated in a digital, or bistable, manner. Digital operation fully deflects a given micromirror to either a first position or a second position. The first position is the "on" position and the second position is the "off" position. Light generated from the color modulator (102; FIG. 2) illuminates the entire array of micromirrors. Micromirrors deflected to the first position reflect light along a first path, whereas micromirrors deflected to a second position reflect light along a second path. The display optics (104) of the display system collect the light from the mirrors in the first or "on" position and focus the light onto an image plane. The light reflected by micromirrors in the second or "off" position is prevented from reaching the image plane. In one exemplary embodiment, as will be explained in detail below, each micromirror may correspond to a "high-resolution pixel" in the finally displayed image. A high-resolution pixel associated with a micromirror in the "on" position is illuminated, whereas a high-resolution pixel associated with a micromirror in the "off" position is not illuminated.

FIG. 3 illustrates control circuitry (121–123) that controls the operation of the micromirrors (120). For example, row select logic (121) and column drive logic (122) may send update data to particular micromirrors in the array of micromirrors (120) to indicate whether the micromirrors are to be in the "on" or "off" position at a given time. Interface electronics (123) may be included in the display system (100; FIG. 1) to interface between the other components of the display system (100; FIG. 1) and the logic (121, 122) controlling the SLM (103). The control circuitry (121–123) is optional and may or may not be included in the display system (100; FIG. 1).

Both the low-resolution spatial color modulator (102; FIG. 2) and the high-resolution modulator (103) may be configured to produce an image with varying levels of intensity, or gray scale. In one embodiment, the color modulator (102; FIG. 2) may be configured to produce a low-resolution color image with a given gray scale level and the high-resolution modulator (103) may be configured to finely resolve the low-resolution color image by adding a number of gray scale levels. In one embodiment, the low-resolution spatial color modulator (102; FIG. 2) and the high-resolution modulator (103) may use pulse width modulation or spatial modulation to generate a given intensity or gray scale level. In other words, a low-resolution pixel associated with a low-resolution spatial color modulator (102; FIG. 2) or a high-resolution pixel associated with a high-resolution modulator (103) may be rapidly turned on and off within a given frame period to generate a desired gray scale level. If a pixel is pulsed quickly enough within a given frame, the human eye will accurately measure the gray scale level of the pixel during that frame, but will fail to detect the pulsing. Low and high-resolution pixels will be explained in detail below.

Figure 4:
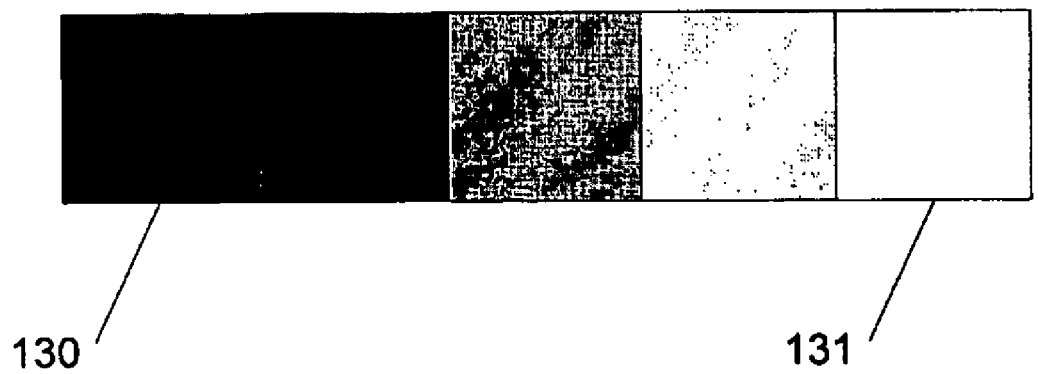
FIG. 4 illustrates a spectrum of exemplary gray scale levels according to one exemplary embodiment.

FIG. 4 illustrates a spectrum of exemplary gray scale levels according to an exemplary embodiment. The gray scale levels of FIG. 4 are illustrative and it will be recognized that there may be more or less levels of gray scale as best serves a particular display system. As shown in FIG. 4, the first gray scale level (130) is completely black. A completely black gray scale level, or a black state, corresponds to a pixel that is in the "off" state during an entire frame or sub-frame. The pixel may be a low-resolution pixel associated with a low-resolution spatial color modulator (102; FIG. 2) or a high-resolution pixel associated with a high-resolution modulator (103). As shown in FIG. 4, the gray scale levels increase in brightness until the last gray scale level (131). The last gray scale level (131) is white and corresponds to a pixel that is in the "on" state during an entire frame. The gray scale levels in between the first and last gray scale levels (130, 131) may be generated by varying the amount of time within a given frame that the pixel is in the "on" state. This variation of the gray scale levels based on "on" or "off" states is referred to as pulse width modulation (PWM).

In one alternative embodiment, the high-resolution modulator (103) may be an analog LCD panel that is configured to pass continuously varying or analog amounts of polarized light depending on a voltage applied to each pixel element. An LCD panel can operate in either a PWM mode or analog mode.

Figure 5:
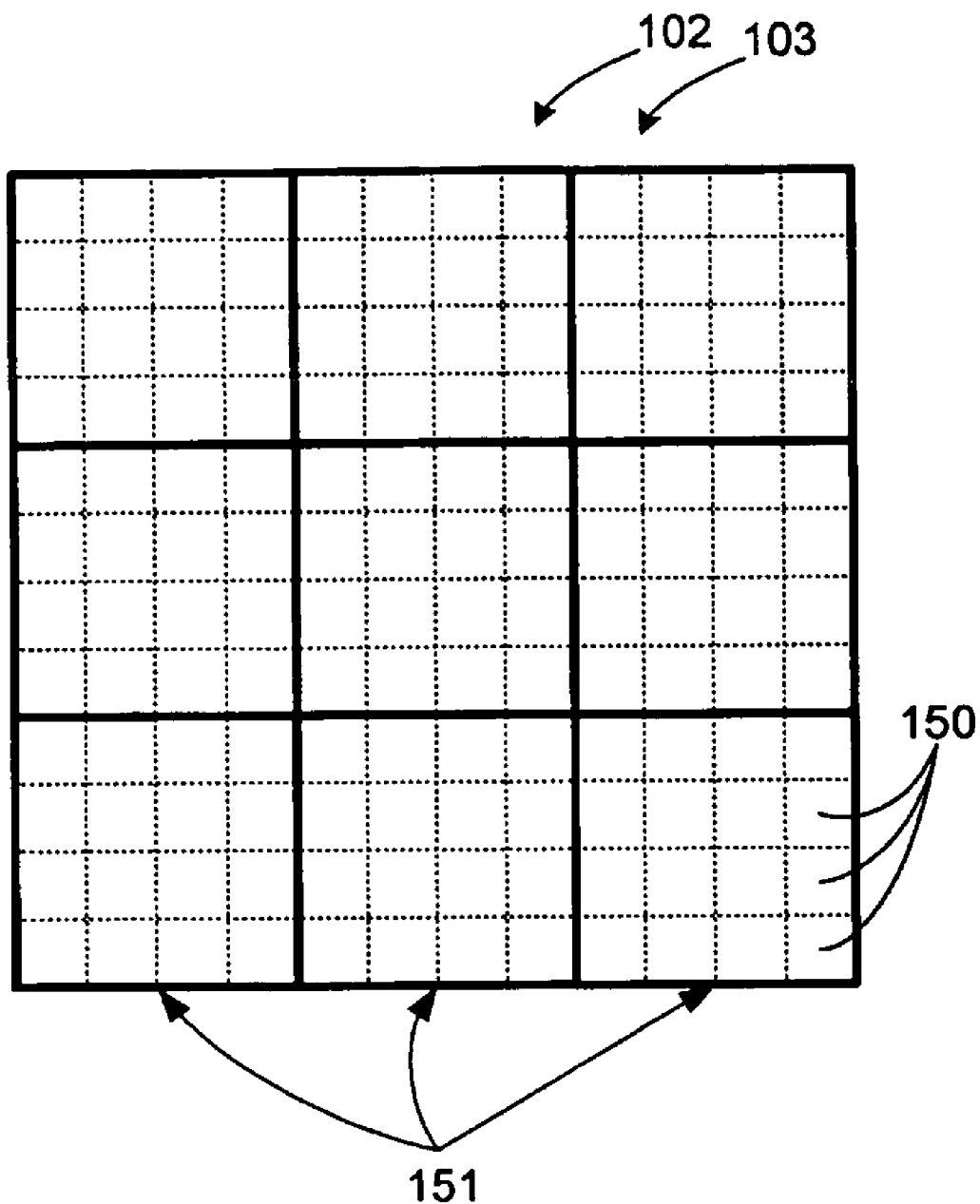
FIG. 5 shows a number of high-resolution pixels of a high-resolution modulator superimposed on a number of low-resolution pixels of a low-resolution spatial color modulator according to one exemplary embodiment.

FIG. 5 shows a number of high-resolution pixels (150) of a high-resolution modulator (103) superimposed on a number of low-resolution pixels (151) of a low-resolution spatial color modulator (102). The high-resolution pixels (150) are indicated by dotted lines and the low-resolution pixels (151) are indicated by solid lines. As shown in FIG. 5, the high-resolution modulator (103) has a higher pixel resolution than does the low-resolution spatial color modulator (102). In other words, the high-resolution pixels (150) are geometrically smaller than are the low-resolution pixels (151). In one exemplary embodiment, the number of high resolution pixels (150) is the same as the number of display pixels in the image that is to be displayed by the display system (100; FIG. 1). The exemplary high-resolution modulator (103) of FIG. 5 has sixteen high-resolution pixels (150) that correspond to each low-resolution pixel (151) of the low-resolution spatial color modulator (102) for illustrative purposes only. The actual dimensions of both the color modulator (102) and the high-resolution modulator (103) may vary as best serves a particular application. For example, the low-resolution spatial color modulator (102) may be 400 by 300 pixels and the high-resolution modulator (103) may be 1600 by 1200 pixels.

FIG. 5 also illustrates the high-resolution pixels (150) and the low-resolution pixel elements (151) as being perfectly aligned for illustrative purposes. However, there may be some degree of misalignment between them due to manufacturing tolerances in real display systems.

Each low-resolution pixel (151) and each high-resolution pixel (150) of FIG. 5 may be either in an "on" state or in an "off" state during a given time period. As will be used herein and in the appended claims, a low-resolution pixel (151) or a high-resolution pixel (150) in the "on" state is activated during a given time period and a low-resolution pixel (151) or a high-resolution pixel (150) in the "off" state not activated during the given time period in the case of digital devices. Furthermore, the terms "turning 'on'" and "activating" a pixel (either a low or high-resolution pixel (151, 150)) herein and in the appended claims will be used interchangeably to refer to causing the pixel to be in the "on" state. A pixel may be turned "on" or activated by controlling the pixel's corresponding micromirror or enabling device within the color modulator (102) or high-resolution modulator (103), for example.

As explained above, the low-resolution spatial color modulator (102) may be configured to generate a plurality of colors at the same time. Thus, the low-resolution pixels (151) of FIG. 5 may be of different colors during the same video frame. Furthermore, as will be described below, a low-resolution pixel (151) may be configured to have different colors during different portions of a video frame thus enabling the high-resolution pixels (150) within the low-resolution pixel (151) to have different colors.

In an alternative embodiment, the low-resolution spatial color modulator (102) may have no "off" state but simply vary between output colors both spatially and temporally for a given frame period. By spatially, we mean that different low-resolution pixels (151) may have different selected colors. By temporally, we mean that the color may change for a given low-resolution pixel (151) during a frame period. In such a case the gray scale levels or black states are determined entirely by the high-resolution modulator (103).

In an alternative embodiment, the high-resolution modulator (103) is an analog device such as an LCD panel having an "on" state, an "off" state, and analog levels between the "on" and "off" states. An analog high-resolution modulator (103) may add gray scale levels to an image by varying the analog level between the "on" and "off" states.

Figure 6:
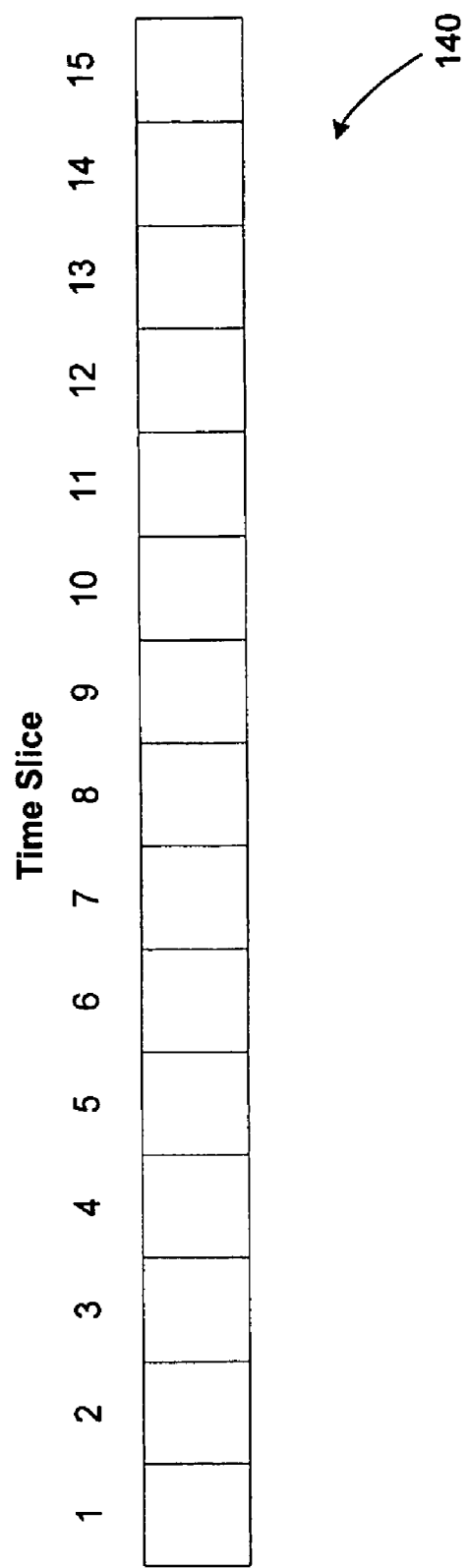
FIG. 6 illustrates an exemplary video frame that has been divided into a number of time slices according to one exemplary embodiment.

FIG. 6 illustrates an exemplary video frame (140) that has been divided into a number of time slices. As will be explained below, the division of a video frame (140) into a number of time slices allows a display system (100; FIG. 1) to generate a color image with varying intensities or gray scale levels. Although the exemplary frame (140) of FIG. 6 is divided into fifteen time slices, the frame (140) may be divided into any number of time slices as best serves a particular application.

According to an exemplary embodiment, in a frame that has been divided into $2^m-1$ time slices, the color modulator (102; FIG. 2) may generate up to $2^m$ possible levels of gray scale for each of the low-resolution pixels (151; FIG. 5) associated with the color modulator (102; FIG. 2). In other words, the color modulator (102; FIG. 2) may generate up to $2^m$ different intensities or shades of a particular color for each of the low-resolution pixels (151; FIG. 5). In terms of bits, in a frame that has been divided into $2^m-1$ time slices, the color modulator (102; FIG. 2) may generate up to m bits of color for each of the low-resolution pixels (151; FIG. 5). The variable "m," as used herein and in the appended claims, may be any integer that is equal to or greater than zero.

Likewise, the high-resolution modulator (103; FIG. 2) may be configured to generate up to $2^m$ levels of gray scale for each of the high-resolution pixels (150; FIG. 5) associated with the high-resolution modulator (103; FIG. 2). In terms of bits, the high-resolution modulator (103; FIG. 2) may generate up to m bits of color for each of the high-resolution pixels (150; FIG. 5).

For example, if a frame is divided into fifteen time slices as shown in FIG. 6, the color modulator (102; FIG. 2) may generate up to sixteen gray scale levels for each of the low-resolution pixels (151; FIG. 5). Likewise, the high-resolution modulator may generate sixteen gray scale levels for each of the high-resolution pixels (150; FIG. 5).

In one exemplary embodiment, the time slices are not all of equal width, but are of varying width. Thus, the number of time slices required to generate various gray scale levels may be reduced. For example, in a binary weighted 4-bit system, there may be four time slices in a frame period having relative time period weightings of 1, 2, 4, and 8 corresponding to time slices representing the least significant bit to the most significant bit. In one embodiment, the more significant time slices may be split across the frame period to reduce visual artifacts as best serves a particular application. For illustrative purposes only, the examples given herein will be explained in terms of equally weighted time slices. However, it will be understood that binary weighted time slices may also be used.

The number of bits of gray scale resolution may vary as best serves a particular application. For example, some display systems may be configured to generate 24-bit color, or eight bits of gray scale for each of three primary colors. Other display systems may be configured to generate more or less than three primary colors, each having more or less than eight bits of gray scale. Thus, an exemplary value for m may be 24. However, as previously explained, the value of m may vary as best serves a particular application.

Figure 7:
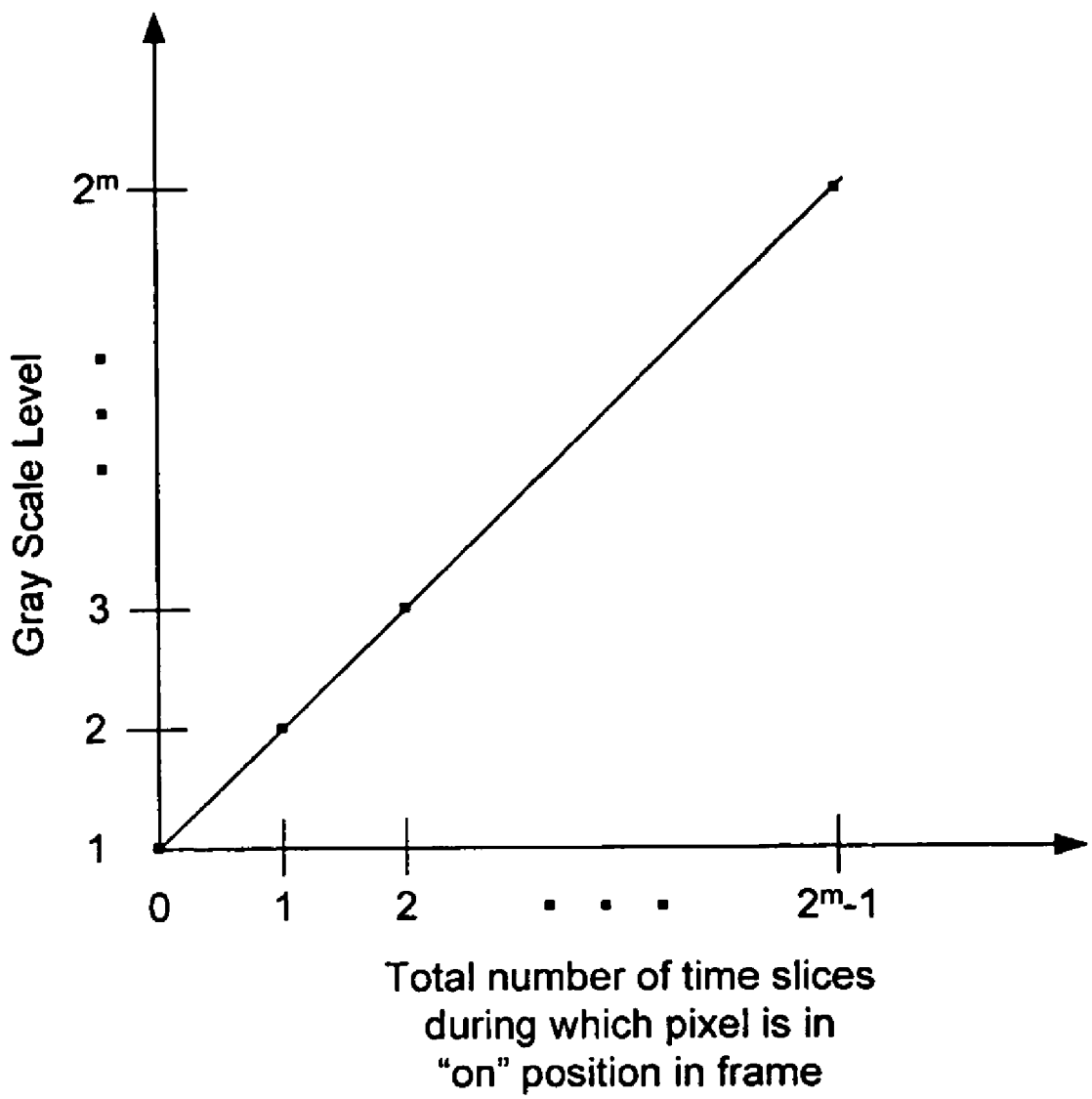
FIG. 7 illustrates that the particular gray scale level of a pixel corresponding to either a color modulator or a high-resolution modulator during a frame may linearly depend on the total number of time slices in the frame during which the pixel is in the "on" state according to one exemplary embodiment.

FIG. 7 illustrates that the particular gray scale level of a pixel corresponding to either the color modulator (102; FIG. 2) or the high-resolution modulator (103; FIG. 2) during a frame may linearly depend on the total number of time slices in the frame during which the pixel is in the "on" state. For explanatory purposes, it is assumed that the color modulator (102; FIG. 2) and the high-resolution modulator (103; FIG. 2) are not working together to produce additional gray scale levels for a particular high-resolution pixel (150; FIG. 5). FIG. 7 shows that either modulator (102, 103; FIG. 2) may generate $2^m$ gray scale levels in a frame that has $2^m-1$ time slices. For illustrative purposes, the gray scale levels in the graph of FIG. 7 are labeled 1, 2, 3, . . . , $2^m$ with a gray scale level of 1 being the lowest (darkest) gray scale level and a gray scale level of $2^m$ being the highest (brightest) gray scale level. Thus, referring to FIG. 7, if a pixel is in the "on" state for none of the time slices in the frame, it has a gray scale level of 1. Likewise, if a pixel is in the "on" state for a total of one time slice, it has a gray scale level of 2. If a pixel is in the "on" position for a total of two time slices, it has a gray scale level of 3. Finally, as shown in FIG. 7, if a pixel is in the "on" state during all $2^m-1$ time slices of a frame, it has a gray scale level of $2^m$.

It is important to note that the gray scale level of a particular pixel depends on the total number of time slices in a frame during which the pixel is in the "on" state. Thus, according to an exemplary embodiment, the pixel may be "on" during any combination of time slices in a frame to achieve a particular gray scale level. For example, using the gray scale annotation of FIG. 7, a low-resolution pixel (151; FIG. 5) may be "on" during any two of the time slices shown in FIG. 4 to achieve a gray scale level of 3. Likewise, a high-resolution pixel (150; FIG. 5) may be "on" during any two of the time slices shown in FIG. 4 to achieve a gray scale level of 3. Referring to FIG. 6, either the low-resolution pixel (151; FIG. 5) or the high-resolution pixel (150; FIG. 5) may be on during time slices 1 and 2, 7 and 8, 15 and 1, or any other combination of two time slices within the frame (140; FIG. 4) to achieve a gray scale level of 3 for the high-resolution pixel (150; FIG. 5). Thus, as will be explained below, the color modulator (102; FIG. 2) and the high-resolution modulator (103; FIG. 2) may work in a complimentary manner to achieve a desired number of gray scale levels for a particular high-resolution pixel (150; FIG. 4).

Figure 8:
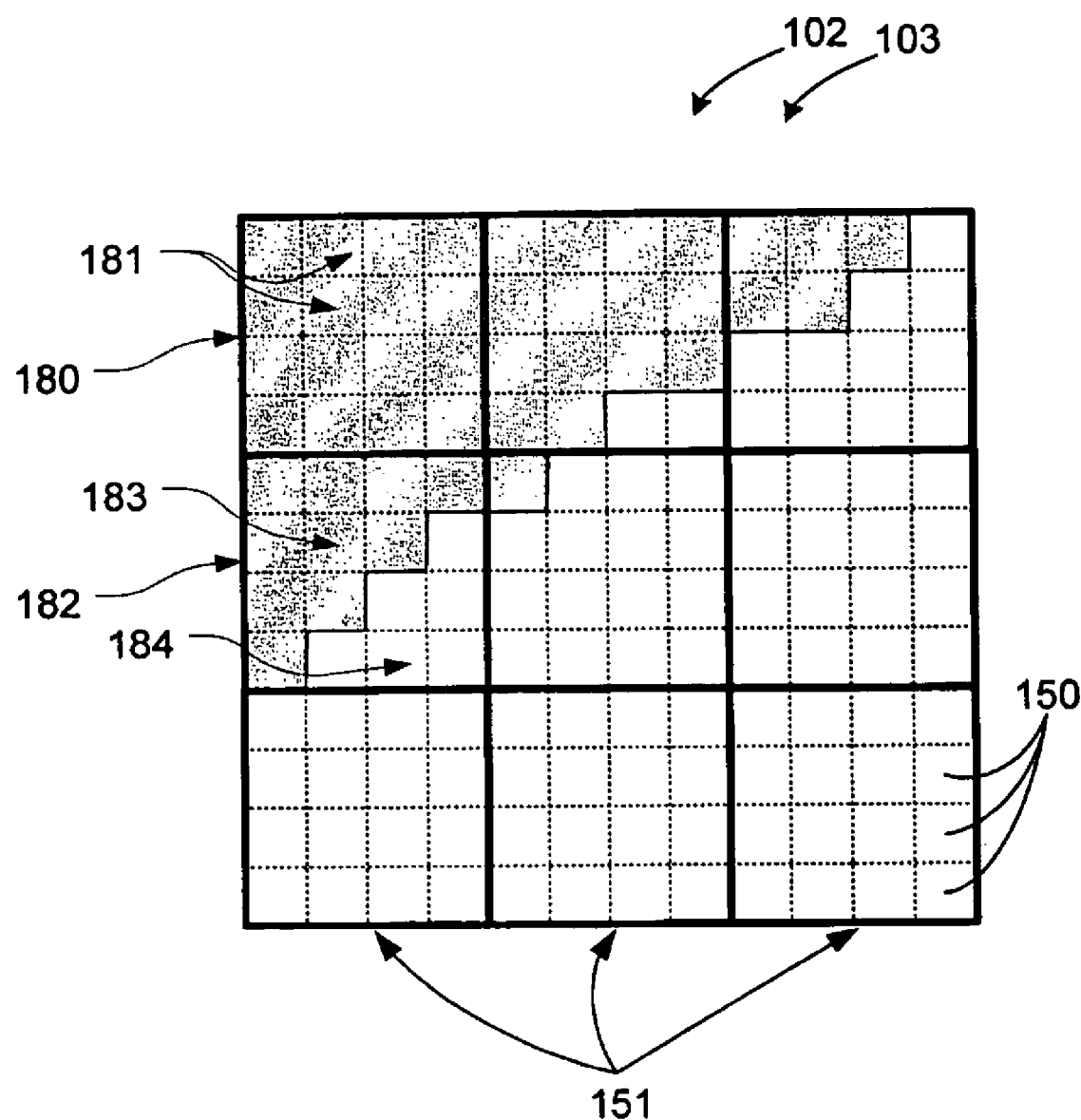
FIG. 8 shows a number of high-resolution pixels superimposed on a number of low-resolution pixels wherein some of the high-resolution pixels are of a first color and others of the high-resolution pixels are of a second color according to one exemplary embodiment.

An exemplary method of generating a color image using a low-resolution spatial color modulator (102) and a high-resolution modulator (103) in series will now be explained in connection with FIGS. 8 and 9. Like FIG. 5, FIG. 8 shows a number of high-resolution pixels (150) superimposed on a number of low-resolution pixels (151). However, FIG. 8 also shows that some of the high-resolution pixels (150) may be of a first color (e.g.; 181) and others of the high-resolution pixels (150) may be of a second color (e.g.; 184). For illustrative purposes, high-resolution pixels (150) in FIG. 8 filled with gray correspond to the first color and high-resolution pixels (150) that are not filled correspond to the second color. In one exemplary embodiment, the first and second colors may be any color such as red, blue, green, black, white, etc.

As shown in FIG. 8, one or more of the low-resolution pixels (151) may include high-resolution pixels (150) that are of a first color and high-resolution pixels (150) that are of a second color. Such low-resolution pixels (151) may for example be located at an edge of two differently colored objects in an image that is to be displayed. For example, in FIG. 8, the low-resolution pixel (182) includes high-resolution pixels (150) that are of the first color (e.g.; 183) and of the second color (e.g.; 184). FIG. 8 shows high-resolution pixels (183, 184) of two different colors in one low-resolution pixel (182) for explanatory purposes only. However, in one exemplary embodiment, the presently described method of generating colored high-resolution pixels (150) may be extended to apply display systems wherein more than two different colors are present within a single low-resolution pixel (151).

Figure 9:
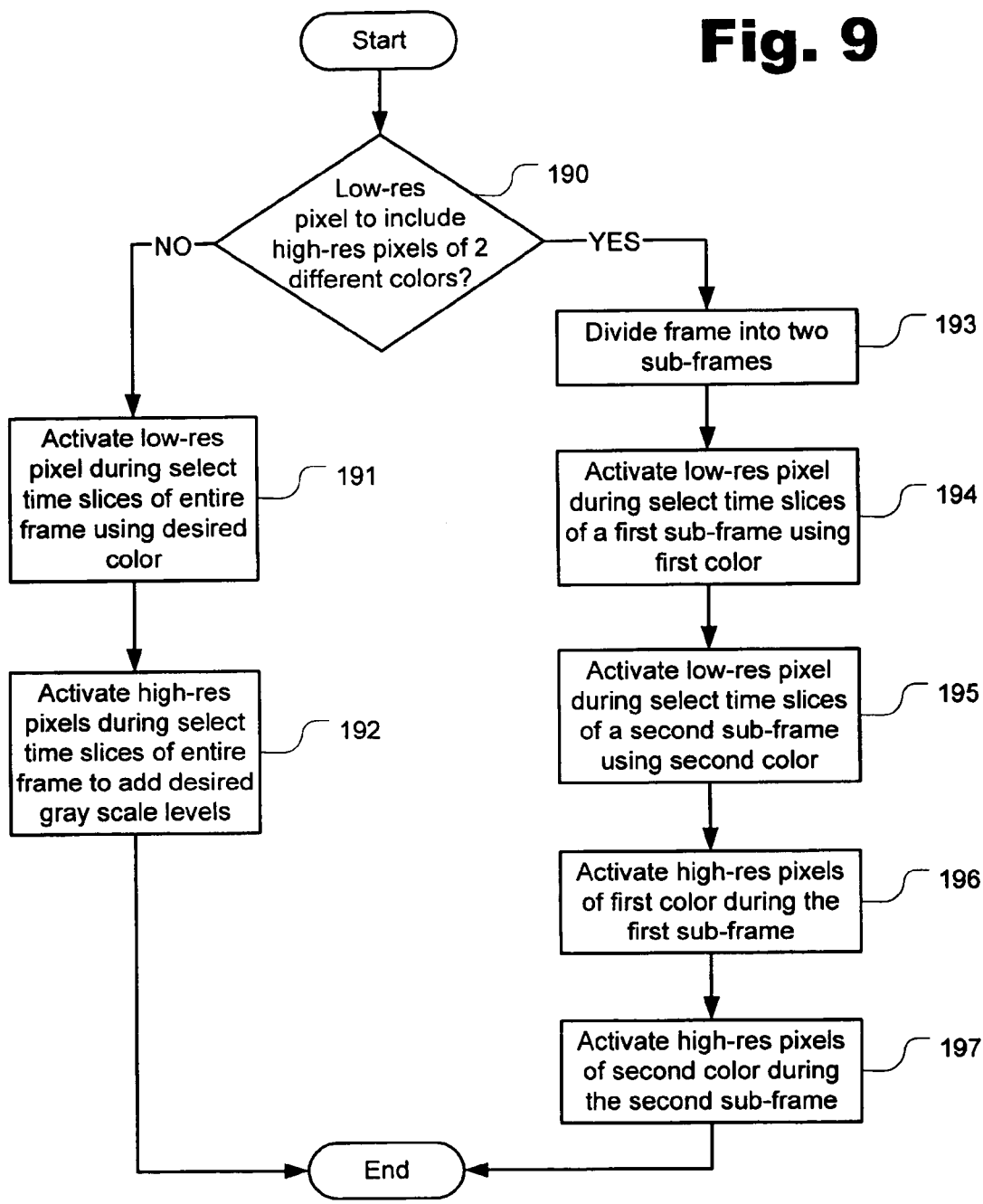
FIG. 9 is an exemplary flow chart illustrating an exemplary method of generating a color image using a low-resolution spatial color modulator in series with a high-resolution modulator according to one exemplary embodiment.

FIG. 9 is an exemplary flow chart illustrating an exemplary method of generating a color image using a low-resolution spatial color modulator (102; FIG. 2) in series with a high-resolution modulator (103; FIG. 2). More specifically, FIG. 9 illustrates an exemplary method of generating color for high-resolution pixels (150; FIG. 8) by coordinating the on/off states of the high-resolution pixels (150; FIG. 8) with their corresponding low-resolution pixel (151; FIG. 5).

In one embodiment, the first step of the exemplary method of FIG. 9 is to determine whether a low-resolution pixel (151; FIG. 8) includes high-resolution pixels (150; FIG. 8) that are to be of different colors (step 190). As used herein and in the appended claims, a "transition low-resolution pixel mode" will be used to refer to instances where a low-resolution pixel (151; FIG. 8) is to include high-resolution pixels (150; FIG. 8) that are to be of different colors (Yes, step 190), Likewise, a "non-transition low-resolution pixel mode" will be used to refer to instances where a low-resolution pixel (151; FIG. 8) is not to include high-resolution pixels (150; FIG. 8) that are to be of different colors (No, step 190). The high-resolution pixels (150; FIG. 8) may be one of two different colors in the exemplary method of FIG. 9 for explanatory purposes only. However, the exemplary method of FIG. 9 may be modified to generate high resolution pixels (150; FIG. 8) of more than two different colors.

If the high-resolution pixels included within the low-resolution pixel are to be of the same color (No, step 190), the color for the high-resolution pixels within the low-resolution pixels may be generated by activating the low-resolution pixel with the desired color during select time slices of an entire frame (step 191). As shown in FIG. 9, the high-resolution pixels may also be activated during select time slices of the entire frame (step 192), thus allowing the high-resolution pixels to keep the same color as the low-resolution pixel while adding any desired additional gray scale levels. An example of generating the same color for a low-resolution pixel and a corresponding high-resolution pixel will be given in connection with the timing diagram of FIG. 10. The timing diagram of FIG. 10 corresponds to the low-resolution pixel (180; FIG. 8) of FIG. 8 and to one of the high-resolution pixels (181; FIG. 8) within the low resolution pixel (180; FIG. 8).

Figure 10:
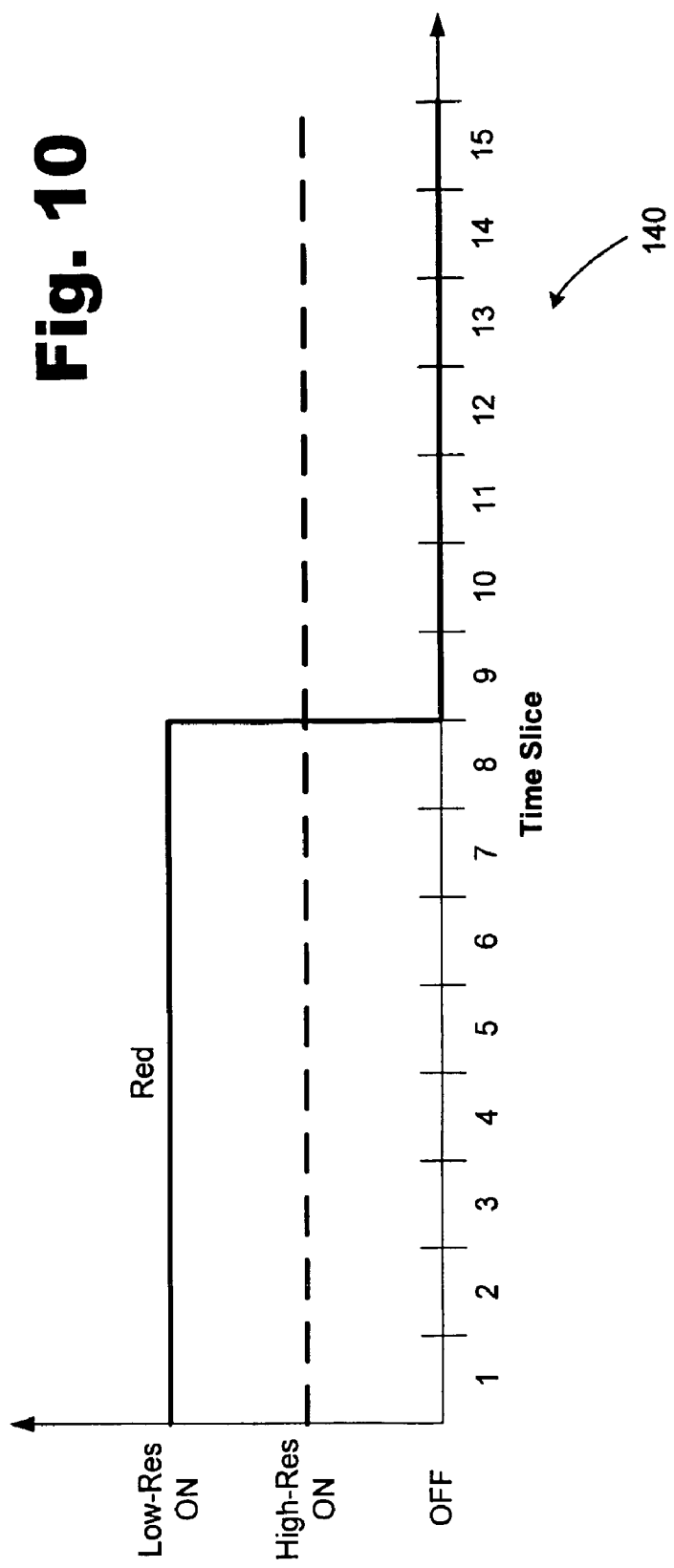
FIG. 10 is a timing diagram showing the on/off state of a low-resolution pixel and a corresponding high-resolution pixel during each time slice of a frame in which the low-resolution pixel and the high-resolution pixel are to be of the same color according to one exemplary embodiment.

FIG. 10 is a timing diagram showing the on/off state of a low-resolution pixel (180; FIG. 8) and a corresponding high-resolution pixel (181; FIG. 8) during each time slice of a frame (140) in which the low-resolution pixel (180; FIG. 8) and the high-resolution pixel (181; FIG. 8) are to be of the same color. The on/off state of the low-resolution pixel (180; FIG. 8) is indicated by a solid line and the on/off state of the high-resolution pixel (181; FIG. 8) is indicated by a dashed line.

For explanatory purposes only, the low-resolution pixel (180; FIG. 8) and the high-resolution pixel (181; FIG. 8) are to be of the same color (red) and have the same intensity or gray scale level (approximately 50 percent). However, it will be understood that the low-resolution pixel (180; FIG. 8) and the high-resolution pixel (181; FIG. 8) may be of any color with any gray scale level.

As shown in FIG. 10, the low-resolution pixel (180; FIG. 8) is in the "on" state for approximately half of the time slices during the frame (140) to achieve an intensity of approximately 50 percent. Because, in this example, the high-resolution pixel (181; FIG. 8) is to have the same intensity as the low-resolution pixel (180; FIG. 8), the high-resolution pixel (181; FIG. 8) is in the "on" state during each of the time slices of the frame (140). However, in an alternative embodiment (not shown), the high-resolution pixel (181; FIG. 8) may be "on" during any number of the time slices of the frame (140) to add a desired number of gray scale levels to the color generated by the color modulator (102; FIG. 2).

Figure 11:
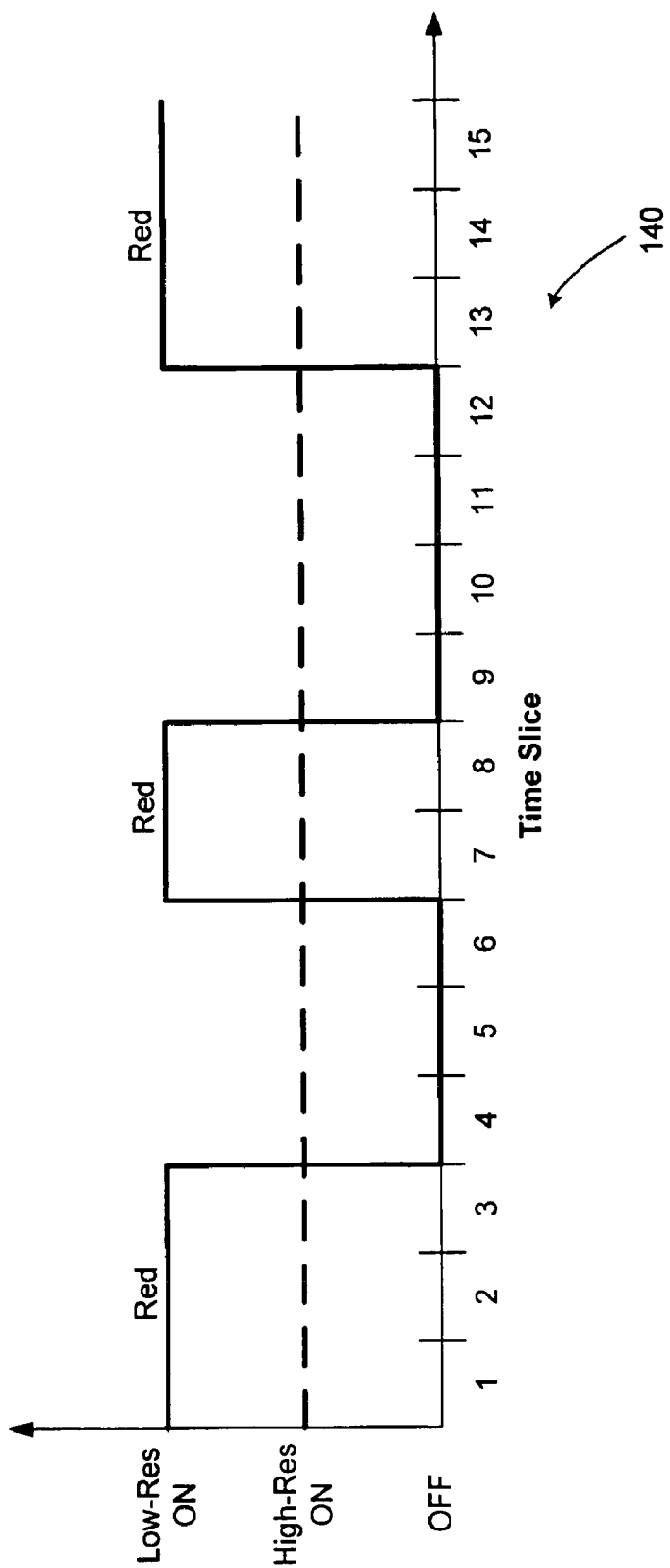
FIG. 11 is an alternative timing diagram showing the on/off state of a low-resolution pixel and a corresponding high-resolution pixel during each time slice of a frame in which the low-resolution pixel and the high-resolution pixel are to be of the same color at the same intensity or gray scale level according to one exemplary embodiment.

In an alternative embodiment, time slices in a frame (140) may be weighted such that the more significant bits of color are split up and spread out over an entire frame period (140). Such weighting may reduce flickering and/or other visual artifacts associated with a displayed image. FIG. 11 is a timing diagram showing the on/off state of a low-resolution pixel (180; FIG. 8) and a corresponding high-resolution pixel (181; FIG. 8) during each time slice of a frame (140) in which the low-resolution pixel (180; FIG. 8) and the high-resolution pixel (181; FIG. 8) are to be of the same color (red) at the same intensity or gray scale level (approximately 50 percent).

As shown in FIG. 11, the low-resolution pixel (180; FIG. 8) is in the "on" state for approximately half of the time slices during the frame (140). However, unlike the example given in connection with FIG. 10, the low-resolution pixel (180; FIG. 8) is "on" during non-consecutive time slices. Thus, as shown in FIG. 11, the low-resolution pixel (180; FIG. 8) is in the "on" state during time slices 1–3, 7–8, and 13–15. The low-resolution pixel (180; FIG. 8) and high-resolution pixel (181; FIG. 8) may be in the "on" state during any sequence of time slices according to an exemplary embodiment.

Figure 12:
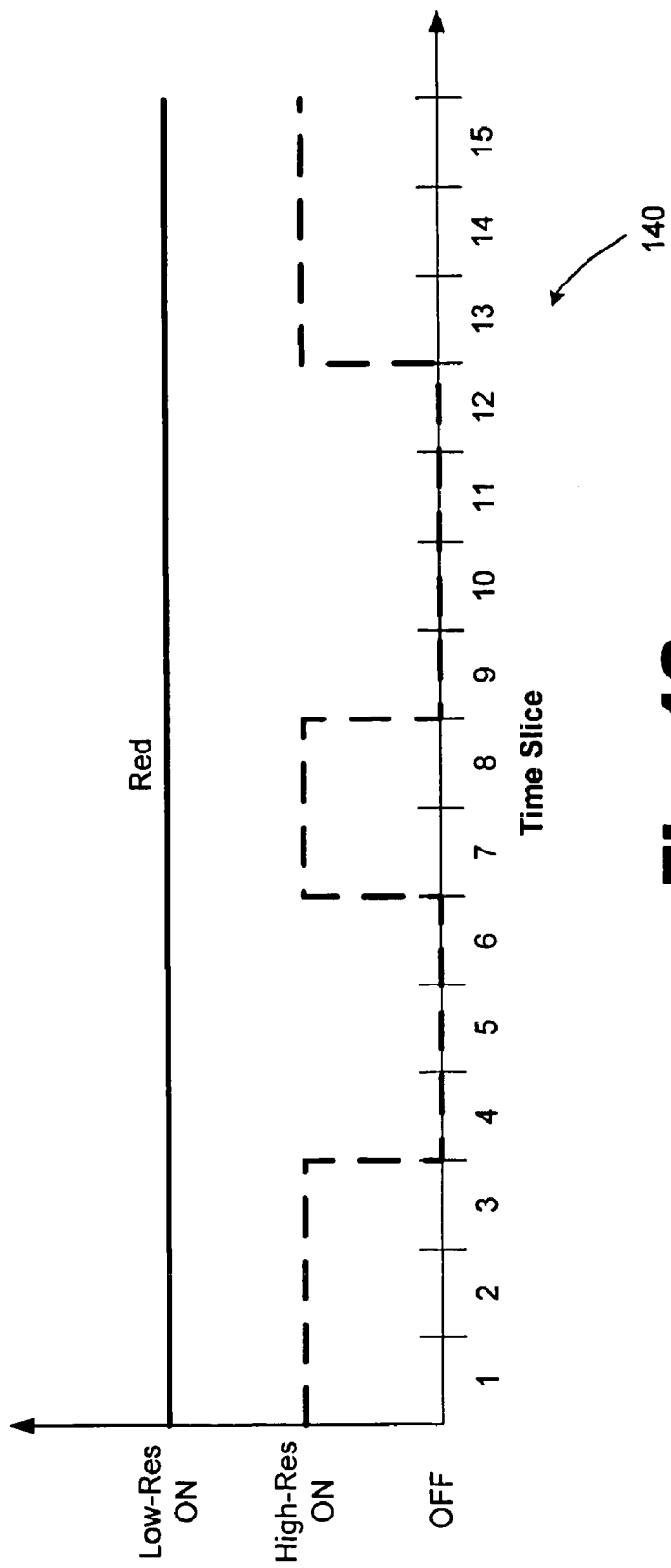
FIG. 12 is an alternative timing diagram showing the on/off state of a low-resolution pixel and a corresponding high-resolution pixel during each time slice of a frame in which the low-resolution pixel and the high-resolution pixel are to be of the same color at the same intensity or gray scale level according to one exemplary embodiment.

FIG. 12 is a timing diagram illustrating yet another alternative embodiment wherein the low-resolution pixel (180; FIG. 8) and the high-resolution pixel (181; FIG. 8) are to be of the same color (red) at the same intensity or gray scale level (approximately 50 percent). As shown in FIG. 12, the low-resolution pixel (180; FIG. 8) may be in the "on" state during the entire frame (140) and the high-resolution pixel (181; FIG. 8) may be in the "on" state for approximately half of the time slices during the frame (140) to generate the color red at approximately half intensity for the high-resolution pixel (181; FIG. 8).

Thus, as shown by the timing diagrams of FIGS. 10–12, the state of either the low-resolution pixel (180; FIG. 8) or the high-resolution pixel (181; FIG. 8) may be controlled to achieve a desired color intensity for the high-resolution pixel (181; FIG. 8). Furthermore, although not shown, it will be recognized that the same color intensity result may also be achieved by simultaneously varying the state of both the low-resolution pixel (180; FIG. 8) and the high-resolution pixel (181; FIG. 8).

Returning to the flow chart of FIG. 9, if the low-resolution pixel includes high-resolution pixels that are to be of two different colors (Yes, step 190), color for the high-resolution pixels may be generated by first dividing the frame into two sub-frames (step 193). Each sub-frame, as will be described in detail below, includes a number of time slices. It will be understood that the exemplary method of FIG. 9 may be modified if there are to be high-resolution pixels of more than two different colors. In this case, the frame may be divided into a number of sub-frames equal to the number of different colors.

After the frame has been divided into sub-frames (step 193), the low-resolution pixel is activated during select time slices of the first sub-frame using a first color (step 194). Then, during the second sub-frame the low-resolution pixel may be activated during select time slices using a second color (step 195). In one embodiment, as will be explained below, the high-resolution pixels that are to be of the first color are activated during the first sub-frame (step 196) and the high-resolution pixels that are to be of the second color are activated during the second sub-frame (step 197).

Figure 13:
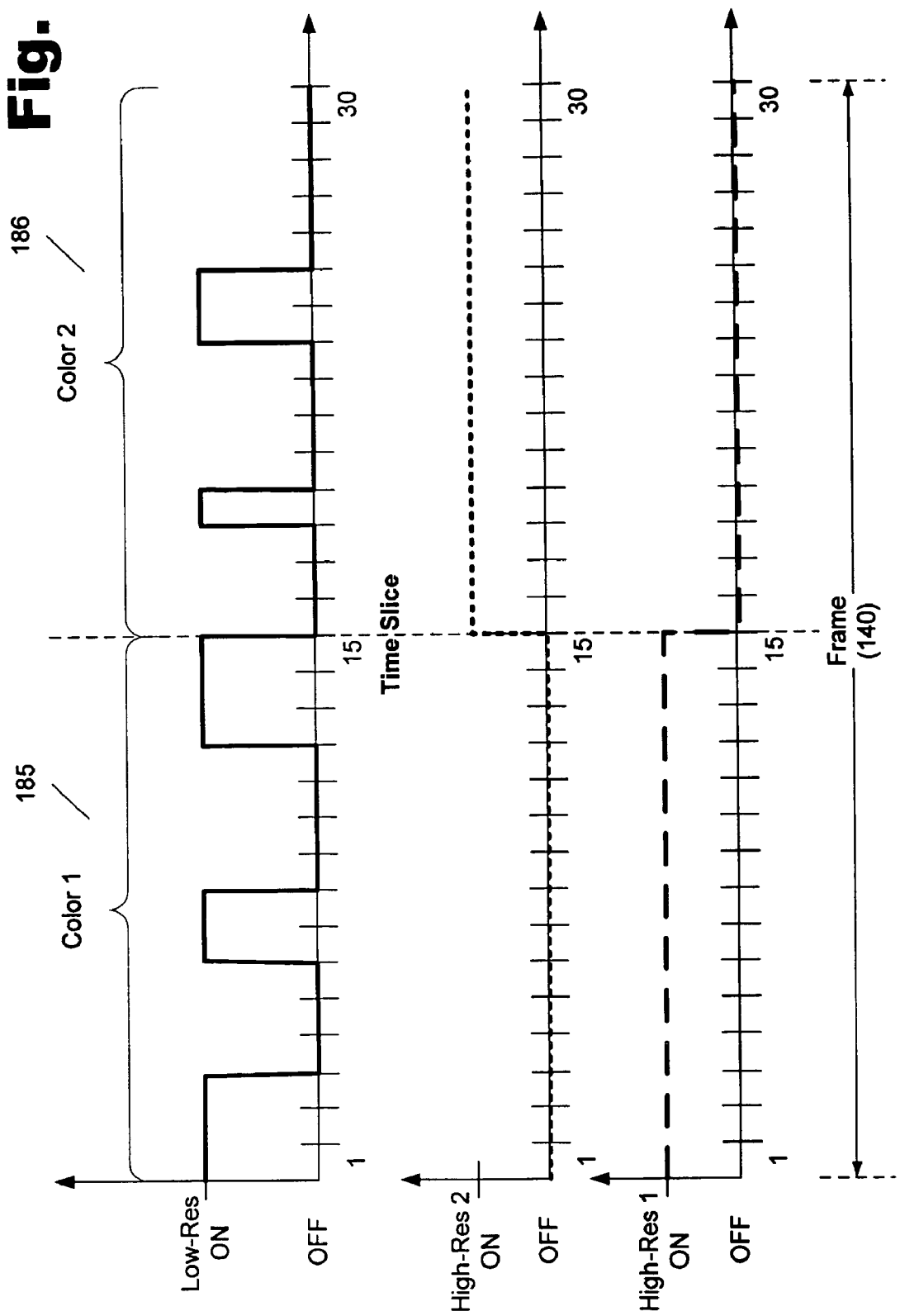
FIG. 13 is a timing diagram showing the on/off state during each time slice of a frame of a low-resolution pixel, a high-resolution pixel of the first color, and a high-resolution pixel of the second color according to one exemplary embodiment.

An example of generating the differently colored high-resolution pixels within the same low-resolution pixel will be given in connection with the timing diagram of FIG. 13. The timing diagram of FIG. 13 shows the on/off state during each time slice of a frame (140) of the low-resolution pixel (182; FIG. 8) of FIG. 8, a high-resolution pixel of the first color (183; FIG. 8) within the low resolution pixel (182; FIG. 8), and a high-resolution pixel of the second color (184; FIG. 8) within the low resolution pixel (182; FIG. 8). As shown in FIG. 8, the low-resolution pixel (182; FIG. 8) includes high-resolution pixels that have a first color (e.g.; 183; FIG. 8) and high-resolution pixels that have a second color (e.g.; 184; FIG. 8).

For explanatory purposes, the first color is indicated by "color 1" in FIG. 13 and the second color is indicated by "color 2." Color 1 and color 2 may be any color according to an exemplary embodiment and may have any intensity or gray scale level.

As illustrated in FIG. 13, the on/off state of the low-resolution pixel (182; FIG. 8) is shown in the top graph and is indicated by a solid line. The on/off state of the high-resolution pixel of the first color (183; FIG. 8) is the shown in bottom-most graph and is indicated by a long-dashed line. Finally, the on/off state of the high-resolution pixel of the second color (184; FIG. 8) is shown in the middle graph and is indicated by a short-dashed line.

As shown in FIG. 13, the frame (140) has been divided into 30 time slices to facilitate generate of both colors using four bits by the color modulator (102; FIG. 2). However, as mentioned previously, the frame (140) may be divided into any number of time slices so as to facilitate a desired number of bits per color.

As shown in FIG. 13, during a first sub-frame (185), the color modulator (102; FIG. 2) generates the first color (color 1) at a desired intensity or gray scale during a first sub-frame (185) by turning "on" the low-resolution pixel (182; FIG. 8) during select time slices (step 194; FIG. 9). As shown in FIG. 13, the first sub-frame (185) may include time slices 1–15. However, in an alternate embodiment (not shown), the first sub-frame (185) may include any 15 time slices in the entire frame. In other words, the time slices of the first and second sub-frames (185, 186) may be interleaved and include non-sequential time slices. However, for explanatory purposes, the first sub-frame (185) will refer to time slices 1–15 and the second sub-frame (186) will refer to time slices 16–30 in the examples given herein.

As shown in FIG. 13, color 1 has an intensity of approximately 50 percent. Thus, the low-resolution pixel (182; FIG. 8) is in the "on" state for approximately half of the time slices in the first sub-frame (185).

During the second sub-frame (186), the color modulator (102; FIG. 2) generates the second color (color 2) at a desired intensity or gray scale turning "on" the low-resolution pixel (182; FIG. 8) during select time slices (step 195; FIG. 9). As shown in FIG. 13, color 2 has an intensity of approximately 20 percent. Thus, the low-resolution pixel (182; FIG. 8) is in the "on" state for approximately one-fifth of the time slices in the second sub-frame (186).

Because the color modulator (102; FIG. 2) has generated both colors for the low-resolution pixel (182; FIG. 8) during the frame (140), a high-resolution pixel (183; FIG. 8) that is to have the first color may be configured to be in the "on" state during the first sub-frame (185) and in the "off" state during the second sub-frame (186) (step 196; FIG. 9), thus keeping only the first color. Likewise, a high-resolution pixel (184; FIG. 8) that is to have the second color may be configured to be in the "on" state during the second sub-frame (186) and in the "off" state during the first sub-frame (185) (step 197; FIG. 9), thus keeping only the second color. Thus, as illustrated in FIG. 13, the high-resolution pixel (183; FIG. 8) that is to have the first color is "on" during time slices 1–15 and "off" during time slices 16–30. Likewise, the high-resolution pixel (184; FIG. 8) that is to have the second color is "on" during time slices 16–30 and "off" during time slices 1–15.

The high-resolution pixels (183, 184; FIG. 8) have the same intensity or gray scale level as the low-resolution pixel (182; FIG. 8) for illustrative purposes only. However, in an alternative embodiment (not shown), the high-resolution pixel (183; FIG. 8) may be "on" during any number of the time slices of the first sub-frame (185) to add a desired number of gray scale levels to color 1 and the high-resolution pixel (184; FIG. 8) may be "on" during any number of the time slices of the second sub-frame (186) to add a desired number of gray scale levels to color 2.

Like the examples given in connection with FIG. 10–12, the state of either the low resolution pixel (182; FIG. 8) or the high-resolution pixels (183, 184; FIG. 8) may be controlled to achieve a desired color intensity for the high-resolution pixels (183, 184; FIG. 8). FIG. 14 is a timing diagram illustrating an exemplary embodiment wherein the states of the high-resolution pixels (183, 184; FIG. 8) are varied to achieve their respective desired color intensities. Furthermore, it will be recognized that the same color intensity result may also be achieved by simultaneously varying the state of both the low-resolution pixel (180; FIG. 8) and the high-resolution pixels (183, 184; FIG. 8).

The order of the steps given in connection with the exemplary method of FIG. 9 may be modified or rearranged as best serves a particular application. Furthermore, the steps may be executed in the order given, simultaneously, or in any other sequential or parallel order as best serves a particular application.

By dividing a frame (140) into sub-frames and generating different colors during the different sub-frames as described in connection with FIGS. 13 and 14, the intensity of the colors of the high-resolution pixels (183, 184; FIG. 8) may be diminished. Thus, to offset this decrease in intensity, the intensity of the colors of neighboring high-resolution pixels (e.g.; 181; FIG. 8) may be increased so that the overall perception of color in the vicinity of the high-resolution pixels (183, 184; FIG. 8) may be improved.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A display system, comprising:
a low-resolution modulator having an first array of pixel elements that independently modulate color to create a low-resolution image; and
a high-resolution modulator receiving the low-resolution image and having a second array of pixel elements each configured to further refine the low-resolution image to create a high-resolution image.

2. The display system of claim 1, further comprising:
a light source; and
wherein the high-resolution modulator modulates light from the light source before the modulated light is received by the low-resolution modulator.

3. The display system of claim 1, further comprising:
a viewing surface that receives the high-resolution image; and
wherein the viewing surface includes a plurality of display pixels which cooperatively interact to form images on the viewing surface.

4. The system of claim 1, wherein said high-resolution images includes a first group of high-resolution pixels having a first hue and a second group of high-resolution pixels having a second hue within an area bounded by a low-resolution pixel.

5. The system of claim 4, further comprising an image processing unit coupled to said low and high resolution modulators, said image processing unit configured to allow said cooperative operation of said low and high resolution modulators.

6. The system of claim 5, wherein said high-resolution image is generated during a frame period during which said image processing unit defines a first color sub-frame corresponding to each of said first group of high-resolution pixels and a second color sub-frame corresponding to each of said second group of high-resolution pixels.

7. The system of claim 6, wherein said first color sub-frame defines a time period during which said first group of high-resolution pixels are activated and said second color sub-frame defines a time period during which said second group of high-resolution pixels are activated.

8. The system of claim 6, wherein said first color sub-frame defines a first set of time slices during which said first group of high-resolution pixels are activated and said second color sub-frame defines a second set of time slices during which said second group of high-resolution pixels are activated.

9. The system of claim 6, wherein said first color sub-frame defines a black state for said second group of high-resolution pixels and said second color sub-frame defines a black state for said first group of high-resolution pixels.

10. The system of claim 1, wherein said high-resolution image is generated during a frame period and wherein for pixel element of the low resolution array, said image processing unit selects between a non-transition low-resolution pixel mode and a transition low-resolution pixel mode.

11. The system of claim 1, wherein said high-resolution modulator is selected from the group consisting of an analog based light modulator, a pulse-width modulation based light modulator, a liquid crystal display (LCD) panel, a liquid crystal on silicon (LCOS) device, and an array of micromirrors.

12. The system of claim 1, wherein said low-resolution modulator comprises a diffractive light device (DLD).

13. The system of claim 1, wherein said low-resolution modulator comprises a digital light filter.

14. A system for modulating a light beam to generate an image, comprising:
means for generating a spatial color distribution of an array of low-resolution pixels; and
means for receiving the spatial color distribution and refining each of the low-resolution pixels to create a number of groups of high-resolution pixels each having a different hue within each low-resolution pixel.

15. The system of claim 14, further comprising:
a means for generating light; and
wherein the means for refining each of the low-resolution pixels modulates light from the means for generating light before the modulated light is received by means for generating a spatial color distribution of an array of low-resolution pixels.

16. The system of claim 14, further comprising:
a means for viewing images that receives the groups of high-resolution pixels; and
wherein the means for viewing includes a plurality of display pixels which cooperatively interact to form images on the viewing surface.

17. The system of claim 16, wherein for each individual low-resolution pixel of said low-resolution pixels, said system further comprises:
means for selecting a non-transition low-resolution pixel mode if said individual low-resolution pixel includes high-resolution pixels that are to be of only one hue; and
means for selecting a transition low-resolution pixel mode if said individual low-resolution pixel includes high-resolution pixels that are to be of multiple hues.

18. The system of claim 14, wherein said number of groups of high-resolution pixels includes a first group of high-resolution pixels having a first hue and a second group of high-resolution pixels having a second hue.

19. The system of claim 18, further comprising means for defining a first color sub-frame defining said first hue and a second color sub-frame defining said second hue.

20. The system of claim 19, wherein said image is defined during a frame period and wherein said first color sub-frame corresponds to at least one portion of said frame period and said second color sub-frame corresponds to at least a second portion of said frame period.

21. The system of claim 20, wherein said first group of high-resolution pixels has a black state for said at least one portion of said frame period and said second group of high-resolution pixels has a black state for said second portion of said frame period.

* * * * *